Jan. 2, 1968   H. MÜLLER   3,360,869
METHOD OF DRYING FILTER RESIDUE
Filed Nov. 28, 1966
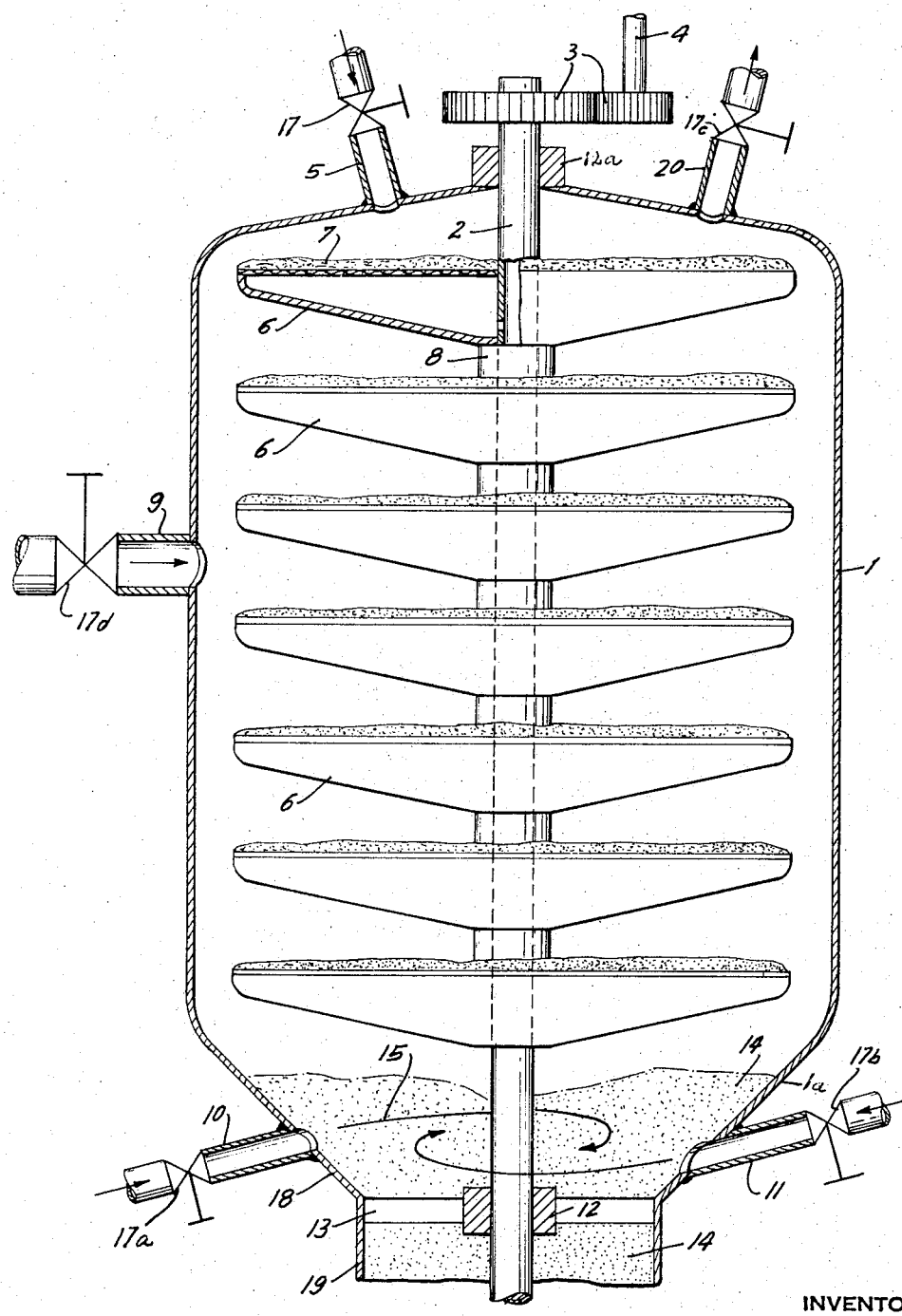
INVENTOR
Hans Müller
BY
Michael J. Striker
ATTORNEY 3,360,869
METHOD OF DRYING FILTER RESIDUE
Hans Müller, Im Allmendli, Erlenbach, Zurich,
Switzerland
Filed Nov. 28, 1966, Ser. No. 597,432
Claims priority, application Switzerland, June 9, 1961,
6,783/61
10 Claims. (Cl. 34—19)

ABSTRACT OF THE DISCLOSURE

A filtering process wherein a wet filter cake is formed on rotatable filter elements located in a filter housing, and wherein the wet filter cake while still in the filter housing is subjected to two drying steps by first being subjected to gas pressure while still located on said filter elements so that a portion of the residual liquid in the filter cake will be mechanically forced into the filter elements, thereafter the filter cake is dislodged from the filter elements by rotation of the latter, and the broken-up filter cake now collecting in the bottom portion of the housing is further dried within the filter housing by heating.

---

The present application is a continuation-in-part of my co-pending application Ser. No. 200,909, filed June 8, 1962, entitled, "Method of Drying Filter Residue," and now abandoned.

Background of the invention

The present invention relates to a combined filtering and drying process, wherein in a filter housing a wet filter cake is formed and subjected to mechanical removal of a portion of its liquid content, followed by breaking-up of the cake and subsequent further drying by contact with hot gas, while the filter cake is still located in the filter housing.

It has been previously proposed to form in a filter housing a filter cake on rotatable filter elements, to dislodge the filter cake, and to subject the dislodged filter cake, after removal from the filter housing, to drying. However, the dislodged filter cake was relatively moist, and by the removal of wet filter cake from the filter housing for subsequent drying, contamination of the filter cake might occur, the cake might have to be exposed to air, and great difficulties arise if it is desired to maintain the filter cake in sterile condition.

These difficulties and disadvantages are overcome by the process of the present invention, according to which the drying of the filter cake is carried out in two steps within the filter housing in which controlled conditions with respect to sterility and contact with gas, for instance only inert gas, can be more easily maintained.

Summary of the invention

The present invention contemplates a filtering process comprising the steps of filtering through a plurality of spaced, horizontal, rotatable filter elements located in a filter housing spaced from the bottom thereof, a liquid having solid particles suspended therein so that the major portion of the liquid passes through the filter elements while the solid particles and a residual portion of liquid are separated and retained on the upper faces of the filter elements forming residual liquid-containing filter cakes thereon, mechanically removing a portion of the residual liquid of the filter cake so as to partially dry the same, rotating the filter elements at a speed sufficient to dislodge the partially dried filter cakes therefrom, the latter dropping into the bottom portion of the housing forming therein a mass of partially dried broken filter cake, and heating the partially dried broken filter cake mass in the bottom portion of the housing so as to evaporate at least a portion of the residual liquid of the partially dried broken filter cake mass, thereby filtering the solids-containing liquid and subjecting the thus separated solids to mechanical removal and to subsequent evaporation of portions of the residual liquid thereof prior to removal of the solids from the filter housing.

An object of the invention is to save a considerable amount of time and consequently release the filter for its primary purpose. Another object of the invention is to completely dry the filter cakes and remove all but 0.5% of the water in about one-fifth of the time otherwise taken. Other objects will appear from the description.

In accordance with the present invention, when the filtering process is completed, the filter cakes are mechanically pre-dried on the filter elements to an approximately half-dry state, preferably by application of gas under pressure, are then thrown off the filter elements into the lower and preferably conical part of the filter housing, where they are fully dried by drying means arranged in this part of the housing.

It is an advantage for the filter elements and the cakes located on them to be set in rotation for the pre-drying process. The speed of rotation is kept low, so that the residue is not thrown off but remains on the filter elements. The slow rotation, which may for example be only a few revolutions per minute or even less, makes the filter cakes dry more uniformly and more rapidly than they would on stationary disks. There is also considerable saving in heating. When the residue is partially dried, i.e. is in an approximately half-dry state, the filter elements are switched over to quick rotation, thus throwing the residue off the filter disks by centrifugal force, although it may also be released from them in any other appropriate manner.

The cake thrown off drops into the lower part of the filter, where the drying is completed by means of heating apparatus, such as tubular coils, electrical heating units and the like, built into the lower part of the filter housing; or it may be effected in vacuo.

Agitating and disintegrating means built into the filter, for example, fastened to the bottom of the rotary shaft, can both accelerate the drying process and disintegrate the residue. If the residue is dried by hot air or hot gas, these media are preferably introduced tangentially, thus agitating the residue in the filter. In this case the filter disks act as dividers between the heating means and any residual dust which may have been carried along. The filter elements may be kept in rotation either intermittently or continuously, so that the separated residue drops down continually. The advantage of agitating is that drying takes place more quickly and there is considerable saving on heating means.

Owing to the appreciable advantages of agitating round the residue, this can also be done when the other above-mentioned drying means are used, as well as with air or gas-drying. In this case special agitators or the like are used.

The gas under pressure which may be used to force part of the liquid content of the filter cake into its supporting filter element, may be a gas which is inert relative to the filter cake, such as nitrogen, and may be at any desired temperature, for instance at ambient temperature.

Brief description of the drawing

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The single view of the drawing is a schematic elevational view of a filter apparatus for carrying out the method of the present invention.

Description of the preferred embodiments

Preferably, the present method may be carried out in an apparatus such as illustrated in the drawing, wherein there is provided a preferably cylindrical housing 1 having a conical lower portion thereof 1a. The supply of the liquid to be filtered is entered through pipe 5 at the upper portion of the housing, which pipe has a valve 17 therein for regulating the amount of inlet of the supply. A gas inlet for introduction of gas under pressure, which is the first stage in the drying process, is denoted at 9 and, it is to be noted, is located just slightly above midway of the length of the tank, and this pipe is controlled also by a valve 17d.

Within the housing 1 there is rotatably mounted in suitable bearings 12 and 12a, a hollow rotatable shaft 2, the upper bearing 12a being exteriorly of the tank and the lower bearing 12 being within the tank and supported centrally thereof at the outlet by means of a spider or ribs 13. The shaft 2 carries spaced apart filter element discs 6, the spacing being effected by suitable rings 8 beneath the discs. The filter cake or residue which collects on the respective filter element discs 6 is denoted at 7.

At the lower portion, preferably in the conical portion 1a of the housing, there is disposed inlet pipes 10 and 11 respectively, which tangentially discharge the heating medium into the filter cake that has been removed by rotation or otherwise from the said discs and is disposed in the conical lower portion of the housing. The inletting of this drying air being tangential effects a sort of whirling motion of the filter cake 14 in the conical portion of the housing as indicated by arrows 15. Each of the inlet pipes 10 and 11 for the drying media, which is the second stage of drying of the already centrifuged cake, is valve controlled as at 17a and 17b respectively.

In the upper portion of the housing 1, there is a discharge pipe 20 for the humid spent hot air and the outlet of the air from this pipe is controlled by a valve 17c.

The rotary hollow shaft 2 at its upper end has a suitable gearing means 3 and attached to one of these gears is a shaft 4 to which a suitable electric motor or any other source of driving means may be attached or, if preferred, the motor or other suitable driving means may be directly attached to the shaft 2 for driving same.

The thus dried cake is removed in conventional manner (not shown) through the bottom portion of the filter housing.

Thus, according to the present invention, a suspension of solids in a liquid is subjected to filtration so as to form a wet filter cake on rotatable filter elements. Without removing the filter cake from the filter housing, the cake, while still located on the filter elements, is mechanically pre-dried by passing through the cake in the direction of the initial withdrawal of liquid by filtration, a gas, such as air at ambient temperature (or an inert gas, for instance nitrogen, if the cake is sensitive to air). Thereby, fine droplets of residual moisture are carried along by the gas and thus removed from the cake. After thus rendering the cake "air dry," the cake is dislodged from the filter elements by centrifugal force created by rotating the filter elements. The filter cake is thereby broken-up into coarse pieces which collect in the lower portion of the filter housing. Thereafter, hot air or another hot drying gas is blown (preferably tangentially) into the lower portion of the housing so as to come in intimate contact with the pre-dried pieces of filter cake. Thereby at least the major part of the residual moisture content of the filter cake pieces is evaporated, if desired under agitation of the cake by the introduced hot gas.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of drying wet filter residue in a filter comprising a closed enclosure, a series of spaced apart filter elements within the enclosure, and means for allowing filter liquid to pass away from the filter elements, comprising the steps of effecting a first drying of the residue on the filter elements within the enclosure by mechanically removing a portion of the residual liquid of the wet filter residue so as to pre-dry said residue on said filter elements and thereby substantially reduce the moisture content thereof; dislodging the pre-dried residue the latter dropping to the lower portion of the enclosure; effecting a second drying of the already pre-dried residue material in the lower portion of the enclosure thereby further reducing the moisture content of the residue; and removing the thus twice dried residue from the lower portion of the enclosure.

2. A filtering process comprising the steps of filtering through a plurality of spaced, horizontal, rotatable filter elements located in a filter housing spaced from the bottom thereof, a liquid having solid particles suspended therein so that the major portion of the liquid passes through the filter elements while the solid particles and a residual portion of liquid are separated and retained on the upper faces of the filter elements forming residual liquid-containing filter cakes thereon; mechanically removing a portion of the residual liquid of said filter cake so as to partially dry the same; rotating said filter elements at a speed sufficient to dislodge the partially dried filter cakes therefrom, the latter dropping into the bottom portion of said housing forming therein a mass of partially dried broken filter cake; and evaporating at least a portion of the residual liquid of said partially dried broken filter cake mass, thereby filtering said solids containing liquid and subjecting the thus separated solids to mechanical removal and to subsequent evaporation of portions of the residual liquid thereof prior to removal of said solids from said filter housing.

3. A filtering process as defined in claim 2, wherein said evaporating of residual liquid of said partially dried broken filter cake mass in said bottom portion of said housing is carried out by contacting said broken filter cake mass in said bottom portion with hot gas.

4. A filtering process as defined in claim 3, wherein said mechanical removal of a portion of the residual liquid is carried out by forcing a portion of said residual liquid of said filter cakes into said filter elements so as to partially dry said filter cakes.

5. A filtering process as defined in claim 4, wherein said forcing of residual liquid into said filter elements is carried out by introducing gas under pressure into said filter housing.

6. A filtering process as defined in claim 5, wherein said introduced gas under pressure is at substantially ambient temperature.

7. A filtering process as defined in claim 6, wherein said gas is air.

8. A filtering process as defined in claim 6, wherein said gas is inert with respect to said filter cake.

9. A filtering process as defined in claim 6, wherein said gas is nitrogen.

10. A filtering process as defined in claim 2, wherein during said mechanical removing of a portion of the residual liquid said filter elements with said cake thereon are rotated at a speed below the speed required for dislodging said cakes from said filter elements.

References Cited

UNITED STATES PATENTS 3,135,588  6/1944  Helming _____ 34—57

FREDERICK L. MATTESON, JR., *Primary Examiner.*
JOHN J. CAMBY, *Examiner.*